United States Patent
Drechsel

(10) Patent No.: US 8,864,050 B2
(45) Date of Patent: Oct. 21, 2014

(54) JET-BREAKER DEVICE FOR JET IRRIGATION APPARATUS AND JET IRRIGATION APPARATUS COMPRISING SUCH DEVICE

(76) Inventor: Arno Drechsel, Lienz (AT)

(*) Notice: Subject to any disclaimer, the term of this patent is extended or adjusted under 35 U.S.C. 154(b) by 259 days.

(21) Appl. No.: 13/294,530

(22) Filed: Nov. 11, 2011

(65) Prior Publication Data
US 2012/0118994 A1 May 17, 2012

(51) Int. Cl.
| | | |
|---|---|---|
| B05B 3/02 | (2006.01) | |
| B05B 3/14 | (2006.01) | |
| B05B 1/26 | (2006.01) | |
| A01G 25/16 | (2006.01) | |
| A01G 25/09 | (2006.01) | |
| B05B 3/04 | (2006.01) | |

(52) U.S. Cl.
CPC ... *B05B 3/14* (2013.01); *B05B 3/02* (2013.01); *B05B 1/26* (2013.01); *B05B 3/0472* (2013.01); *A01G 25/16* (2013.01); *A01G 25/092* (2013.01)
USPC ............ 239/230; 239/233; 239/252; 239/232

(58) Field of Classification Search
USPC ............... 239/230–233, 214, 214.11–214.25, 239/221.11, 390, 505, 507
See application file for complete search history.

(56) References Cited

U.S. PATENT DOCUMENTS

| | | | | | |
|---|---|---|---|---|---|
| 4,669,663 | A | * | 6/1987 | Meyer | 239/230 |
| 4,858,829 | A | * | 8/1989 | Drechsel | 239/230 |
| 5,392,990 | A | * | 2/1995 | Iwata et al. | 239/232 |
| 5,622,316 | A | * | 4/1997 | Drechsel | 239/230 |
| 5,740,523 | A | * | 4/1998 | Nakajima et al. | 455/186.1 |
| 7,051,952 | B2 | * | 5/2006 | Drechsel | 239/256 |

* cited by examiner

*Primary Examiner* — Jason Boeckmann
*Assistant Examiner* — Joel Zhou
(74) *Attorney, Agent, or Firm* — Themis Law

(57) ABSTRACT

A jet-breaker device for a jet irrigation apparatus having a supporting frame with a portion for anchoring it to the launch pipe of an irrigation apparatus, jet-breaker means connected to the frame and designed to at least partially project out of the nozzle of the apparatus for interfering with the outlet jet. The jet-breaker means include at least one jet-breaking element which is designed to oscillate with a predetermined frequency in a plane between a position substantially aligned with the nozzle for interfering with the jet and causing partial breaking thereof, and a position misaligned with the nozzle in which it does not interfere with the jet. The jet-breaker means are motorized for controllably adjusting the oscillation of the jet-breaking element and changing the oscillation frequency thereof. A jet irrigation apparatus incorporating the jet-breaker device.

4 Claims, 3 Drawing Sheets

JET-BREAKER DEVICE FOR JET IRRIGATION APPARATUS AND JET IRRIGATION APPARATUS COMPRISING SUCH DEVICE

FIELD OF THE INVENTION

The present invention generally finds application in the field of irrigation systems for agricultural areas, and particularly relates to jet-breaker device for a jet irrigation apparatus.

The invention further relates to a jet irrigation apparatus incorporating such jet-breaker device.

BACKGROUND ART

In soil irrigation, there is a recognized need to ensure the most uniform distribution of the irrigation liquid delivered by an irrigation apparatus of a fixed or movable system.

Particularly, it is important to avoid excessive liquid supply in certain areas and inadequate liquid supply in other areas.

Furthermore, the liquid jet should reach the soil in an appropriately distributed fashion, and not be excessively concentrated, to prevent soil damages.

Gun-type irrigation apparatus are also known, which have a launch pipe with an internal conduit for delivering a liquid jet, and with a jet supply nozzle at one end.

A jet-breaker device is placed at the nozzle, and has a jet-breaking element which is designed to interfere with the jet to break it, thereby allowing liquid distribution to a larger soil area.

The action of the jet-breaking element allows liquid to reach the soil in a substantially uniform, predetermined concentration.

Thus, liquid will be distributed in a substantially constant fashion, both close to the system and in the remotest areas that can be reached by the jet.

One drawback of this solution is that the action of the jet-breaking element is constant and cannot be adjusted according to the flow rate and range of the nozzle jet.

Due to the continuous interference of the jet-breaking element with the jet, the distribution of liquid to the soil cannot be easily adapted to particular irrigation requirements.

In an attempt to obviate this drawback, various irrigation apparatus with jet-breaker devices have been developed, in which the jet-breaking element is movably connected to the launch pipe and interferes with the jet in a discontinuous manner.

The jet-breaking element is mounted to a bracket that oscillates relative to the launch pipe under the action of the jet on the jet-breaking element.

The jet-breaking element has a cyclic motion, which is caused by the force generated during the interference between the element and the jet.

Therefore, the oscillation frequency of the interference element depends on the jet flow rate and range.

While this configuration allows liquid distribution to be changed according to the flow rate and range, it still suffers from certain drawbacks.

Namely, this solution does not allow the oscillation frequency of the jet-breaking element to be changed when the jet flow rate and range is constant.

This drawback is particularly disadvantageous when a soil portion is to be irrigated with different liquid distributions.

A further drawback of this solution is that low-flow, short-range jets considerably reduce the oscillation stroke of the jet-breaking element, which will not have enough energy to distribute the jet, and will deliver a compact jet for long periods of time.

In this case, a particularly concentrated jet may cause damages to the soil and crops.

This particularly occurs when jet delivery begins, i.e. when common jet-breaker devices cannot prevent the jet from reaching the soil in compact form.

DISCLOSURE OF THE INVENTION

The object of the present invention is to overcome the above drawbacks, by providing a jet-breaker device for a jet irrigation apparatus that achieves high efficiency and relative cost effectiveness and allows effective liquid delivery with no water waste.

A particular object is to provide a jet-breaker device for an irrigation apparatus that allows selective uniform irrigation liquid distribution in response to the water supply requirements of the soil.

A particular object is to provide a jet-breaker device for a jet irrigation apparatus that prevents formation of compact jets even when jet delivery begins.

A further object is to provide a jet-breaker device for a jet irrigation apparatus that ensures optimal operation even at low pressures.

Yet another object is to provide a jet-breaker device for a jet irrigation apparatus that can be controlled either autonomously or through the control system of the irrigation apparatus or system with which it is associated.

Another important object is to provide a jet irrigation apparatus that affords uniform adjustable jet distribution according to various pressures and/or flow rates and the particular requirements of the soil portion to be irrigated.

These and other objects, as better explained below, are fulfilled by a jet-breaker device as defined in claim 1, which is adapted to be used with a jet irrigation apparatus, of the type having a launch pipe with a nozzle at one end, for supplying an irrigation liquid jet, wherein the device comprises a supporting frame with a portion for anchoring it to the launch pipe of the irrigator, and jet-breaker means connected to said frame and designed to at least partially project out of the nozzle of the irrigator for interfering with the outlet jet.

The jet-breaker means (9) comprise at least one jet-breaking element which is designed to oscillate with a predetermined frequency in a plane between a position substantially aligned with the nozzle for interfering with the jet and causing partial breaking thereof, and a position misaligned with the nozzle (6) in which it does not interfere with the jet.

The device is characterized in that the jet-breaker means are motorized for controllably adjusting the oscillation of the jet-breaking element and changing the oscillation frequency thereof.

This particular configuration allows the action of the jet-breaker means, and hence the jet distribution profile, to be adjusted in response to special requirements and/or flow pressure and/or flow rate parameters.

In a further aspect, the invention provides a jet irrigation apparatus as defined in claim 12, which incorporates the above jet-breaker device.

Advantageous embodiments of the invention are defined in accordance with the dependent claims.

BRIEF DESCRIPTION OF THE DRAWINGS

Further features and advantages of the invention will become more apparent from the detailed description of a few preferred, non-exclusive embodiments of a jet irrigation device having a jet-breaker device according to the invention, which are described without limitation with the help with the accompanying drawings in which.

DETAILED DESCRIPTION OF A PREFERRED EMBODIMENT

Figure 1:
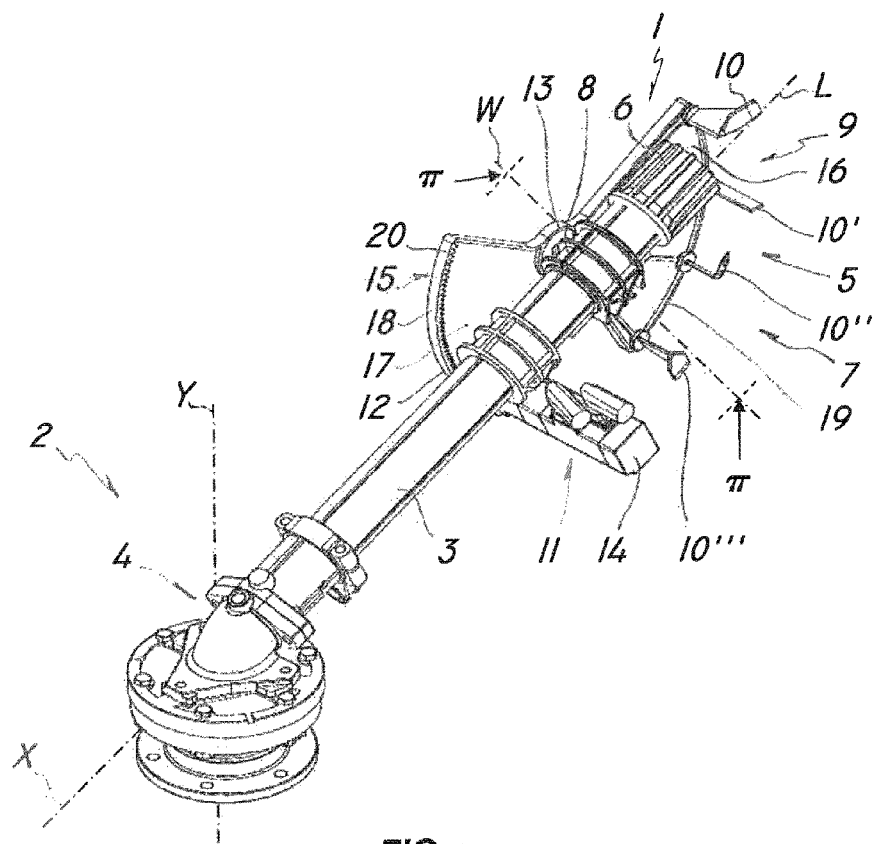
FIG. 1 is a perspective view of an irrigation apparatus with the jet-breaker device of the invention in a first preferred configuration and in a first operating state.
Figure 2:
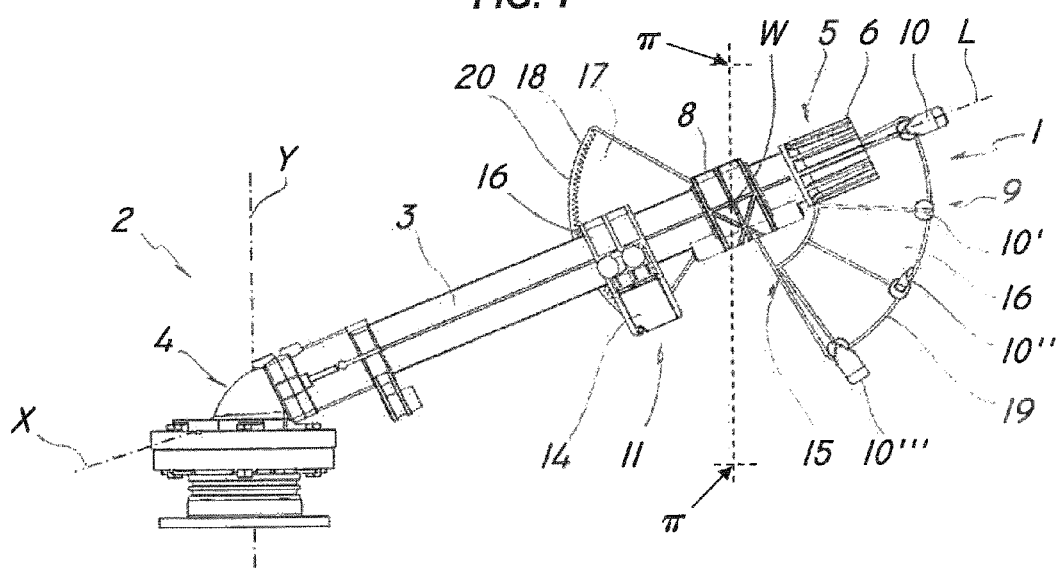
FIG. 2 is a side view of the apparatus and device of FIG. 1.
Figure 3:
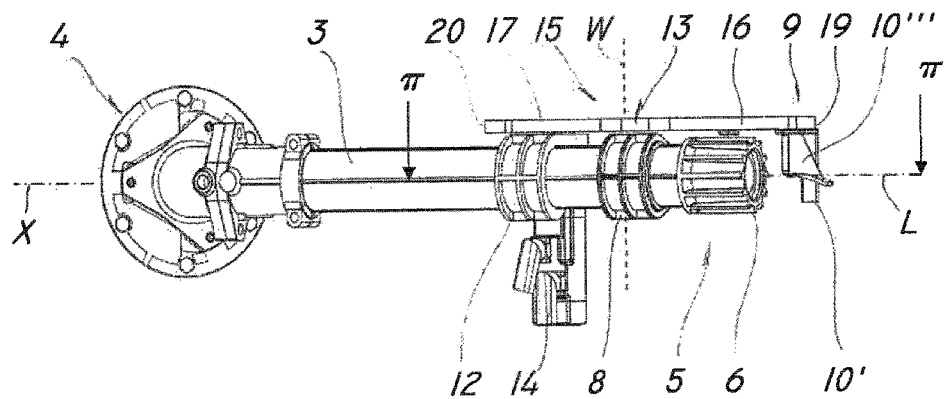
FIG. 3 is a top view of the apparatus and device of FIG. 1.

Referring to the above figures, the jet-breaker device of the invention, generally designated by numeral 1, may be mounted, preferably in a removable fashion, to a gun-type irrigation apparatus.

The irrigation apparatus, generally referenced 2, essentially comprises a launch pipe 3 which defines a main extension axis X.

As is known per se, the launch pipe 3 allows passage of a flow of irrigation liquid therein, to act as a long-range gun.

The pipe 3 has a first axial end 4 adapted to be connected to a liquid supply line of the system and to be anchored to a fixed or movable part of an irrigation system, not shown and known per se.

The opposite end 5 is equipped with a nozzle 6 for supplying an irrigation liquid jet.

The apparatus 2 may be installed both in fixed and movable irrigation systems, without requiring particular changes for adaptation to the characteristics of each particular system.

For instance, the apparatus 2 may be installed in "center pivot" systems, having a load-bearing arm hinged at one end to pivot about a central point and irrigate a circular area of a generally quadrangular land.

The apparatus 2 is also suitable for use in irrigation systems typically known as "waterreels", with a hose of predetermined diameter and length wound on a turning reel, and having a cart at one end with the apparatus 2 designed to be mounted thereto.

Figure 4:
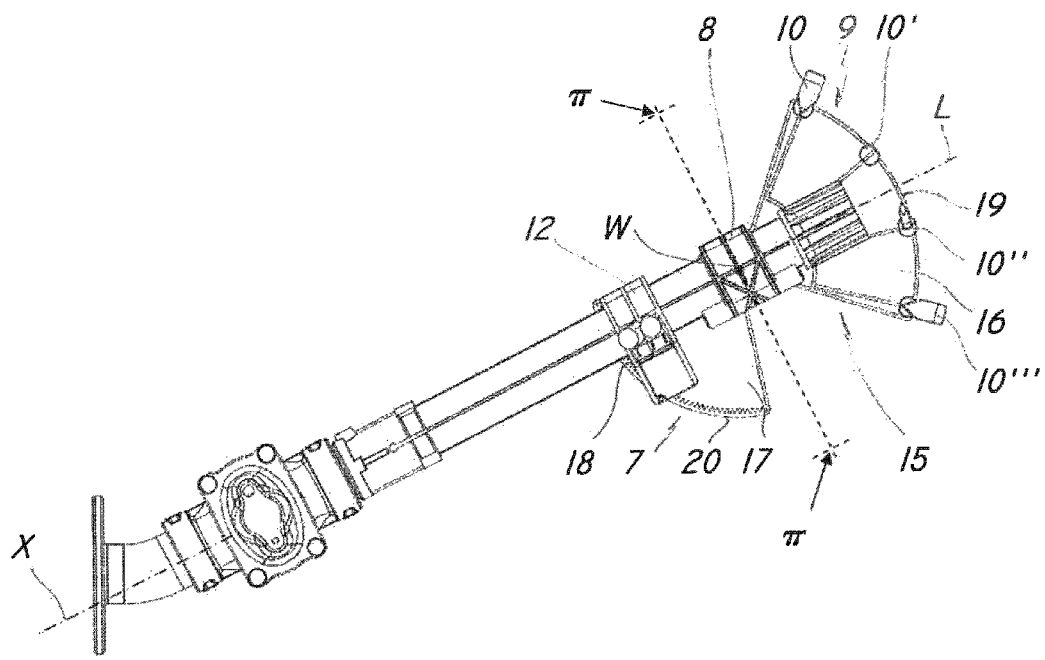
FIG. 4 is a side view of an irrigation device in a second preferred configuration and with the jet-breaker device of FIG. 1 in a second operating state.
Figure 5:
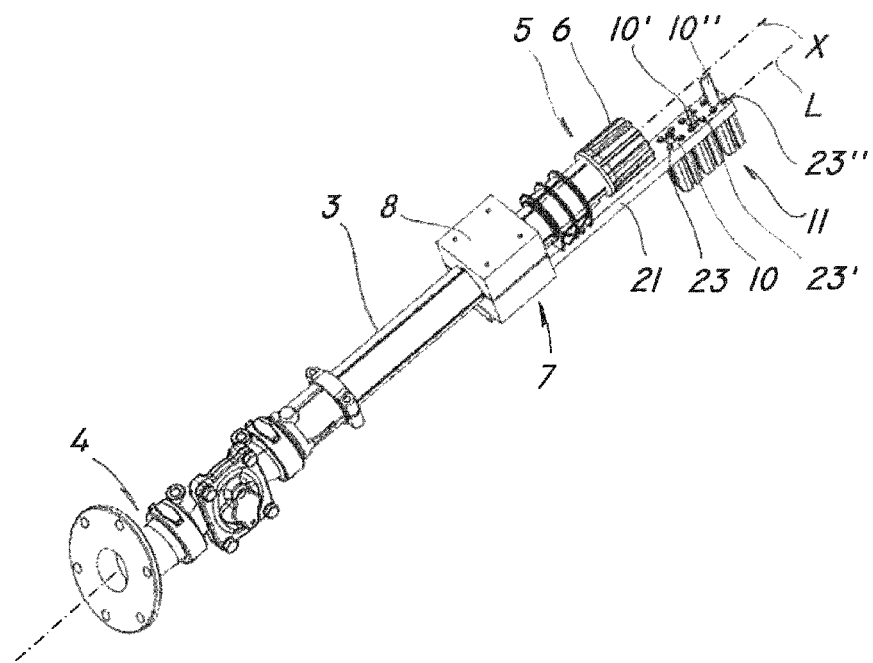
FIG. 5 is a perspective view of the irrigation apparatus of FIG. 4, with a jet-breaker device in a second preferred configuration.
Figure 6:
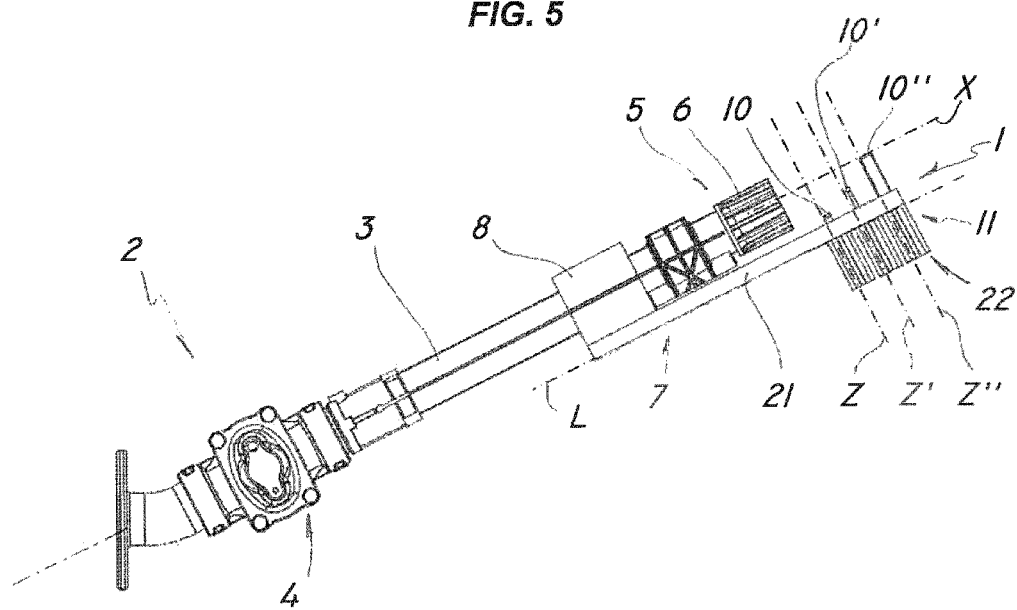
FIG. 6 is a side view of the apparatus and device of FIG. 5.

The launch pipe 3 may be mounted to the irrigation system at its first end 4, either in fixed fashion, like in the configuration of FIGS. 4 and 5, or in pivoting fashion, as shown in FIG. 1.

In the latter case, the launch pipe 3 may pivot about a substantially vertical axis Y, to cover large soil areas.

Furthermore, if the apparatus 2 is mounted to a movable part of irrigation system, such as the pivoting arm of a center pivot system, or an articulated portion thereof, such as in prior art center pivot systems with corner arms, a more accurate and uniform adjustment of liquid distribution may be obtained, by synchronizing rotation of the launch pipe 3 about its axis of rotation Y with the rotation of the arm of the system about its own axis of rotation, which is also generally vertical.

For example, the apparatus 2 may be fixed to one end of the pivoting arm or the corner arm of the system, to irrigate the angular sectors of a rectangular land.

In this case, the apparatus 2 may be equipped with a position sensor, such as an encoder, not shown, which is adapted to determine the angular position of the launch pipe 3 relative to the axis Y.

The inner circular area of the land will be covered by the pivoting arm, and will be irrigated, as is known to the skilled person, by a plurality of sprinkler irrigation apparatus which are adapted to pivot integrally with the arm.

A jet-breaker device 1 of the invention comprises a supporting frame 7 with a portion 8 for anchoring it to the launch pipe 3 of the irrigation apparatus 2 and jet-breaker means 9 connected to the frame 7 and designed to at least partially project out of the nozzle 6 of the irrigation apparatus 2 for interfering with the outlet jet.

The jet-breaker means 9 comprise at least one jet-breaking element 10 which is designed to oscillate with a predetermined frequency in an oscillation plane between a position substantially aligned with the nozzle 6 and a position misaligned with the nozzle 6.

Particularly, in the aligned position, the jet-breaking element 10 may interfere with the jet to partially break it.

On the other hand, in the misaligned position, it will not interfere with the jet, which may be directed to the soil in an undistributed fashion.

In accordance with a peculiar feature of the invention, the jet-breaker means 9 are motorized for controllably adjusting the oscillation of the jet-breaking element 10 and changing the oscillation frequency thereof, thereby changing the frequency at which the element 10 interferes with the jet.

Particularly, the device comprises motor means 11 associated with the support frame 7 and acting upon the jet-breaker means 9 to promote oscillation thereof.

In a preferred, non-limiting configuration of the invention, the frame 7 comprises a first supporting portion 12 for the motor means 11 and a second supporting portion 13 for the jet-breaker means 9.

The first 11 and second 12 supporting portions will be both adapted to be anchored to the launch pipe 3 of the apparatus 2 to which they are mounted.

The configuration so obtained will be particularly compact and easily installable on any jet irrigation apparatus 2.

However, the motor means 11 may be also installed on an external support or the ground, and be connected to the jet-breaker means 9 by cables or other electrical wiring, not shown.

Preferably, the motor means 11 comprise an electric motor 14 which is integral with the first supporting portion 12 for direct fixation thereof to the launch pipe 3.

For example, the first supporting portion 12 may have a substantially tubular shape, allowing it to be mounted coaxial with the launch pipe 3.

The anchor portion 8 of the frame 7 may also have a tubular shape, defining a longitudinal axis L, allowing it to be mounted to the launch pipe 3 with its axis L parallel to or coincident with the extension axis X of the latter.

The second supporting portion comprises a plate 15 which is rotatably mounted to the anchor portion 8 to rotate about an axis of rotation W substantially orthogonal to the oscillation plane.

Particularly, the axis of rotation W of the plate 15 is substantially orthogonal to the longitudinal axis L of the anchor portion 8.

The axis of rotation W may have any orientation with respect to the ground, possibly differing from the particular orientation as shown.

Therefore, the oscillation plane π of the jet-breaking element 10 is substantially parallel to the longitudinal axis L and hence to the axis X of the launch pipe 3.

Nevertheless, the device 1 may be mounted to any part of the apparatus 2, provided that the oscillation plane π is not orthogonal to the axis X of the pipe 3.

The jet-breaking element 10 will be in its aligned position when it interferes with the longitudinal axis L of the anchor portion 8, and hence with the extension axis X of the launch pipe 3.

On the other hand, in the misaligned position, the jet-breaking element 10 will be rotated in the oscillation plane π relative to the above-mentioned aligned position, by a sufficient angle to come out of the action range of the nozzle 6.

Furthermore, the rotating plate 15 comprises the first end portion 16 which is designed to support the jet-breaking element 10.

The plate 15 also has a second end portion 17, having a kinematic element 18 which is adapted to interact with the motor means 11 to promote rotation of the plate 15 about the axis of rotation W.

In the configuration as shown in FIGS. 1 to 4, which has to be intended simply as an example of the present invention, the kinematic element 18 is of the sprocket and rack type.

Particularly, the first 16 and a second 17 end portion of the plate 15 may be shaped as angular sectors, with respective curvilinear, preferably circular edges 19 and 20.

The kinematic element 18 may be stably associated with the curvilinear edge 20 of the second end portion 17.

For example, the kinematic element 18 may be a toothed bar extending along the entire edge 20 or a portion thereof, according to the desired maximum angle of rotation.

The kinematic element 18 interacts with a second kinematic element which is situated within the motor 14 not shown, to form a gear with the first element 18.

Nevertheless, the above described solution should be merely intended as an example, and the skilled person may easily replace the kinematic element 18 as shown herein with any motion-transferring member that can cause rotation of the plate 15 about its axis of rotation W.

For example, the kinematic element 18 may be any cam-and-follower, slider-crank mechanism or the like, with a portion associated with the frame 7 of the device 1 and a portion associated with and driven by the motor means 11.

The motor 14 may be also of any type, for example a stepper motor, a worm gear motor or any other type of electric motor.

The first end portion 16 of the plate 15 may also have a substantially curvilinear and circular edge 19.

Preferably, the two edges 19 and 20 may have the same bending radius, for more accurate, simpler oscillation control.

The jet-breaking element 10 is fixedly or removably mounted to any part of the first end portion 16, to orthogonally project out of the oscillation plane π.

Preferably, the jet-breaking element 10 is located at the edge 19.

In a particularly advantageous embodiment of the invention, the jet-breaker means 9 comprise a plurality of jet-breaking elements, four in the configurations of FIGS. 1 to 4, referenced 10, 10', 10'', 10''', having different configurations.

The jet-breaking elements 10, 10', 10'', 10''' are mounted to the first end portion 16, preferably at its edge 19 and in angularly offsets positions, to orthogonally project out of the oscillation plane π.

Thus, the jet-breaking elements 10, 10', 10'', 10''' can be selectively placed in front of the outlet opening of the nozzle 6 to oscillate between the aligned position and the misaligned position.

The jet-breaking elements 10, 10', 10'', 10''' may be fixedly or removably mounted to the plate 15.

The jet-breaking elements may be also in greater or smaller numbers than those illustrated herein, and may also be selected from a series of more elements than those 10 that can be simultaneously placed on the plate 15.

The shape of each element is selected according to the desired flow distribution profile, with no particular restriction.

Particularly, one or more 10, 10''' of the jet-breaking elements may be starters which, upon interaction with the jet and as a result of the deflection thereof, will cause a clockwise or counterclockwise radial reaction, for controlled rotation of the launch pipe 3 about the vertical axis of rotation Y.

In operation, the motor means 11 may impart a first wider rotational movement to the plate 15, to selectively move one of the elements 10, 10', 10'', 10''' near the nozzle 6.

Then, the motor means 11 may be actuated to impart an oscillatory motion having a predetermined frequency and possibly also dynamically end interactively variable, to the selected element 10, 10', 10'', 10'''.

Thus, the irrigation liquid distribution profile may be adjusted according to the requirements of each individual portion of soil, i.e. according to flow rate and pressure values, or possibly to other external parameters such as environmental conditions, particularly wind.

This also prevents the jet-breaking element 10 from not having enough force for adequate jet breaking, at the start.

FIG. 5 shows a second embodiment of the jet-breaker device 1. Here, the second supporting portion 13 of the frame 7 comprises an elongate bracket 21, which is stationary relative to the anchor portion 8.

The bracket 21 is designed to be mounted coaxial with the launch pipe 3 to axially project out of the nozzle 6 by an end portion 22. A jet-breaking element 10 is placed at such end portion, and is associated with the motor means 11.

The latter are designed to cause oscillation of the jet-breaking element 10 in a direction substantially orthogonal to the bracket 21.

The motor means 11 may be of pneumatic, hydraulic or possibly electromechanical type, and are adapted to control the reciprocation of the jet-breaking element 10 in and out of a housing 23, which is formed therefor in the end portion 22 of the bracket 21.

This embodiment also can provide multiple jet-breaking elements, three in the configuration of FIG. 5, referenced 10, 10', 10'', which are associated with the stationary bracket 21 in axially offset positions.

The motor means 11 allow selection of one of such jet-breaking elements 10, 10', 10'', e.g. by retracting the others into their housings 23, 23', 23'' and later impart the required oscillatory motion to the selected element 10 in respective directions Z, Z', Z'', which are parallel to each other and substantially orthogonal to the longitudinal axis L defined by the bracket 21.

In another aspect, which is common to both embodiments, the motor means 11 may be operably associated with a logic control unit with a computer, not shown.

The computer will be adapted to manage the various operating parameters, such as pressure, flow rate, area to be irrigated, amount of liquid to be distributed, for dynamic adaptation of the oscillation frequency of the jet-breaking element 10, possibly to the rotation frequency of the launch pipe 3, and to select the appropriate jet-breaking element 10, 10', 10", 10'''.

Furthermore, the control unit may also be the central control unit of the whole irrigation system with which the apparatus 2 is associated, and can thus have a simpler structure and management.

The above disclosure clearly shows that the invention fulfills the intended objects and particularly meets the requirement of providing a jet-breaker device for a jet irrigation apparatus that ensures a highly flexible use, and provides the most appropriate irrigation liquid distribution profiles for any particular requirement.

The device and apparatus of this invention are susceptible to a number of changes or variants, within the inventive concept disclosed in the appended claims. All the details thereof may be replaced by other technically equivalent parts, and the materials may vary depending on different needs, without departure from the scope of the invention.

While the device and apparatus have been described with particular reference to the accompanying figures, the numerals referred to in the disclosure and claims are only used for the sake of a better intelligibility of the invention and shall not be intended to limit the claimed scope in any manner.

The invention claimed is:

1. A jet-breaker device for a jet irrigation apparatus (2) having a launch pipe (2) disposed along an extension axis (X) and provided at one end (5) of a nozzle (6) for supplying an irrigation liquid let, the device comprising:
    a support frame (7) having an anchoring portion (8) for attachment to the launch pipe (3) of the let irrigation apparatus (2); and
    a jet-breaker (9) connected to said support frame (7) and configured to at least partially project with respect to the nozzle (6) of the jet irrigation apparatus (2) for interfering with an outlet jet, wherein said jet-breaker (9) comprises at least one jet-breaking element (10) configured to oscillate with a predetermined frequency on a plane (π) substantially parallel to said extension axis (X) between a position substantially aligned with the nozzle (6), such to interfere with the irrigation liquid jet and cause a partial breaking thereof, and a position misaligned with the nozzle (6), such to not interfere with the irrigation liquid jet, and
    wherein said jet-breaker (9) is motorized such to controllably adjust oscillation of said at least one jet-breaking element (10) and modify an oscillation frequency thereof,
    further comprising a motor (11) operatively coupled to said support frame (7) to act on said jet-breaker (9), promoting oscillation thereof, adjusting the oscillation of said at least one jet-breaking element (10), and modifying an oscillation frequency thereof,
    wherein said support frame (7) comprises a first supporting portion (12) of said motor (11) and a second supporting portion (13) of said let-breaker (9), said first (12) and said second supporting portion (13) being both configured to be anchored to the launch pipe (3) of the let irrigation apparatus (2) on which said first (12) and said second supporting portion (13) are installed,
    wherein said let-breaker (9) comprises a plurality of interference elements (10, 10', 10", 10''') having different configurations and mounted on said second supporting portion (13), said interference elements (10, 10', 10", 10''') being selectively locatable in front of an outlet opening of the nozzle (6) for oscillating between said substantially aligned position and said misaligned position,
    wherein said second supporting portion (13) comprises a plate (15) rotatably mounted onto said anchoring portion (8) and configured to rotate about a rotation axis (W) substantially orthogonal to said plane (π), and
    wherein said anchoring portion (8) is substantially tubular, has a longitudinal axis (L), and is configured to be mounted onto the launch pipe (3) coaxially therewith, said rotation axis (W) of said plate (15) being substantially orthogonal to said longitudinal axis (L).

2. A jet-breaker device for a jet irrigation apparatus (2) having a launch pipe (2) disposed along an extension axis (X) and provided at one end (5) of a nozzle (6) for supplying an irrigation liquid jet, the device comprising:
    a support frame (7) having an anchoring portion (8) for attachment to the launch pipe (3) of the jet irrigation apparatus (2); and
    a jet-breaker (9) connected to said support frame (7) and configured to at least partially project with respect to the nozzle (6) of the jet irrigation apparatus (2) for interfering with an outlet jet, wherein said jet-breaker (9) comprises at least one jet-breaking element (10) configured to oscillate with a predetermined frequency on a plane (π) substantially parallel to said extension axis (X) between a position substantially aligned with the nozzle (6), such to interfere with the irrigation liquid let and cause a partial breaking thereof, and a position misaligned with the nozzle (6), such to not interfere with the irrigation liquid let, and
    wherein said let-breaker (9) is motorized such to controllably adjust oscillation of said at least one jet-breaking element (10) and modify an oscillation frequency thereof,
    further comprising a motor (11) operatively coupled to said support frame (7) to act on said jet-breaker (9), promoting oscillation thereof, adjusting the oscillation of said at least one jet-breaking element (10), and modifying an oscillation frequency thereof,
    wherein said support frame (7) comprises a first supporting portion (12) of said motor (11) and a second supporting portion (13) of said jet-breaker (9), said first (12) and said second supporting portion (13) being both configured to be anchored to the launch pipe (3) of the jet irrigation apparatus (2) on which said first (12) and said second supporting portion (13) are installed,
    wherein said jet-breaker (9) comprises a plurality of interference elements (10, 10', 10", 10''') having different configurations and mounted on said second supporting portion (13), said interference elements (10, 10', 10", 10''') being selectively locatable in front of an outlet opening of the nozzle (6) for oscillating between said substantially aligned position and said misaligned position,
    wherein said second supporting portion (13) comprises a plate (15) rotatably mounted onto said anchoring portion (8) and configured to rotate about a rotation axis (W) substantially orthogonal to said plane (π),
    wherein said plate (15) comprises a first end portion (16) designed to support said at least one let-breaking element (10) and a second end portion (17) united with said first portion (16) and provided with a kinematic element (18) adapted to interact with said motor (11) to promote rotation of said first end portion (15) about said rotation axis (W), and wherein said first end portion (16) of said plate (15) has a substantially circular edge (19), along which said interference elements (10, 10', 10", 10''') are arranged in angular offset positions.

3. The device as claimed in claim 2, wherein said kinematic element (18) comprises a sprocket, a rack type, a cam type, or a rod-crank.

4. A jet irrigator apparatus comprising:
   a launch pipe (3) defining a main extension axis (X) and having,
      a first end (4) anchorable to a fixed or movable part of an irrigation plant, and
      a second end (5) having a nozzle (6) configured to supply an irrigation liquid jet; and
   a jet-breaker device (1) having,
      a support frame (7) with a portion (8) for anchoring said jet-breaker device to said launch pipe (3), and
      a jet-breaker (9) connected to said support frame (7) and configured to at least partially axially project with respect of said nozzle (6) for interfering with an outlet jet,
   wherein said jet-breaker (9) comprises at least one jet breaking element (10) configured to oscillate with a predetermined frequency on a plane (π) substantially parallel to said extension axis (X) between a position substantially aligned with said nozzle (6), such to intercept the irrigation liquid jet and determine a partial breaking thereof, and a position misaligned with respect of said nozzle (6) wherein it does not interfere with the irrigation liquid jet, and
   wherein said jet-breaker (9) is motorized to controllably adjust oscillation of said at least one jet-breaker element (10) and modify an oscillation frequency thereof,
   further comprising a motor (11) operatively coupled to said support frame (7) to act on said jet-breaker (9), promoting oscillation thereof, adjusting the oscillation of said at least one jet-breaking element (10), and modifying an oscillation frequency thereof,
   wherein said support frame (7) comprises a first supporting portion (12) of said motor (11) and a second supporting portion (13) of said jet-breaker (9), said first (12) and said second supporting portion (13) being both configured to be anchored to the launch pipe (3) of the jet irrigation apparatus (2) on which said first (12) and said second supporting portion (13) are installed,
   wherein said let-breaker (9) comprises a plurality of interference elements (10, 10', 10", 10''') having different configurations and mounted on said second supporting portion (13), said interference elements (10, 10', 10", 10''') being selectively locatable in front of an outlet opening of the nozzle (6) for oscillating between said substantially aligned position and said misaligned position,
   wherein said second supporting portion (13) comprises a plate (15) rotatably mounted onto said anchoring portion (8) and configured to rotate about a rotation axis (W) substantially orthogonal to said plane (π), and
   wherein said anchoring portion (8) is substantially tubular, has a longitudinal axis (L), and is configured to be mounted onto the launch pipe (3) coaxially therewith, said rotation axis (W) of said plate (15) being substantially orthogonal to said longitudinal axis (L).

* * * * *